(12) United States Patent
Case (10) Patent No.: US 7,956,861 B2
(45) Date of Patent: Jun. 7, 2011

(54) METHOD FOR CHECKERBOARD-BASED VECTOR TO RASTER CONVERSION

(75) Inventor: Robert M. Case, Canyon Lake, TX (US)

(73) Assignee: Romse Tech Research, L.L.C., Wilmington, DE (US)

(*) Notice: Subject to any disclaimer, the term of this patent is extended or adjusted under 35 U.S.C. 154(b) by 976 days.

(21) Appl. No.: 11/890,003

(22) Filed: Aug. 4, 2007

(65) Prior Publication Data

US 2009/0033678 A1  Feb. 5, 2009

(51) Int. Cl.
*G06T 11/20* (2006.01)
(52) U.S. Cl. .......... 345/441; 345/611
(58) Field of Classification Search .......... 345/441, 345/611; 358/2.99
See application file for complete search history.

(56) References Cited

U.S. PATENT DOCUMENTS

| 4,254,467 | A | | 3/1981 | Davis et al. | |
| 5,291,310 | A | * | 3/1994 | Levien | 358/3.2 |
| 5,307,181 | A | * | 4/1994 | Levien | 358/3.13 |
| 5,442,461 | A | * | 8/1995 | Levien | 358/3.19 |
| 5,589,851 | A | | 12/1996 | Valdes | |
| 6,002,493 | A | | 12/1999 | Case | |
| 7,307,628 | B1 | * | 12/2007 | Goodman et al. | 345/421 |
| 2004/0227771 | A1 | | 11/2004 | Arnold et al. | |
| 2007/0109320 | A1 | | 5/2007 | Skibak et al. | |

FOREIGN PATENT DOCUMENTS

| WO | WO02077919 | 10/2002 |
| WO | WO2009020532 | 2/2009 |

OTHER PUBLICATIONS

International Search Report and Written Opinion for Appln. No. PCT/US2008/009129, completed Apr. 1, 2009, 14 pgs.
Hersch, R.D. "Character Generation Under Grid Constraints," Computer Graphics, vol. 21 (4), Jul. 1987, pp. 243-251.
Hersch et al. "Advanced Grid Constraints: Performance and Limitations," Raster Imaging and Digital Typography Proceedings of the International Conference, Cambridge, GB, Jan. 1, 1991, pp. 190-204.
Warnock, J.E. "The Display of Characters Using Gray Level Sample Arrays," Computer Graphics USA, vol. 14 (3), Jul. 1980, pp. 302-307.

* cited by examiner

*Primary Examiner* — Jeffery A Brier
(74) *Attorney, Agent, or Firm* — Sterne, Kessler, Goldstein & Fox PLLC (57) ABSTRACT

Provided is a method for converting an input vector outline image to an output monochrome raster image consisting of only corner-contiguous pixels in a checkerboard pattern. Using a combination of a monochrome checkerboard raster image and a vector-based diamond grid, a determination is made as to which output raster pixels are activated. Efficiencies in file size and computational complexity are realized by using a checkerboard pattern and only half the possible number of raster output pixels. The method improves monitor and printer raster displays for any personal computing or related device, reducing the need for anti-aliasing and font hinting.

12 Claims, 14 Drawing Sheets

METHOD FOR CHECKERBOARD-BASED VECTOR TO RASTER CONVERSION

BACKGROUND

1. Technical Field

The claimed subject matter relates generally to raster images and, more specifically, to a method for converting vector elements to monochrome raster elements.

2. Description of the Related Art

Mathematically-defined vectors have proven to be an efficient method for digitally reproducing human drawings and symbols. Vectors representing points and straight and curved lines presently are used to depict nearly any imaginable shape, including fonts.

Rendering vectors using a personal computing device often has necessitated the conversion of these vector representations to raster representations. With the exception of plotters, a digital device's output displays in raster form, either on a monitor screen or on a printer.

The most common method of converting a vector input to a raster output is to project the vector on to a monochrome raster grid and to turn on those grid pixels touched by the vector. This method causes output pixels to touch at both the sides and at the corners. As a result, diagonal and curved lines often exhibit an unwanted artifact: a stair-step pattern known as aliasing. Especially at low raster resolutions, this jagged representation becomes objectionable when compared to horizontal and vertical lines that do not exhibit the artifact.

A number of "work-a-rounds" have been developed to reduce the visual impact of this aliasing, most notably the technologies of "hinting" and "anti liasing." Hinting is associated with vector fonts and is an additional instruction set included in font metrics to designate certain raster pixels at low resolutions to best represent the particular font. Anti-aliasing is a method that replaces the monochrome raster with a multi-bit pixel-depth raster that displays grayscale. Shades of gray are used to smooth the abasing stair-step pattern. Both require increases in instruction storage and execution time.

In U.S. Pat. No. 6,002,493, "Method for reproducing an image," Case demonstrates a way to convert a multi-bit pixel-depth raster to a monochrome raster. His patent describes the use of a temporary raster image in a checkerboard pattern between the input and output stages. The monochrome checkerboard pattern exhibits a smooth gray when viewed from a suitable distance. Case depicts areas of the input image darker than checkerboard gray by turning to black only the white checkerboard pixels in the corresponding area of the output raster image. Areas of the input image lighter than checkerboard gray are depicted by turning to white only the black checkerboard pixels in the corresponding area of the output raster image. Although Case uses a checkerboard, no mention is made of vector to raster conversion.

In U.S. Pat. No. 5,589,851, "Multi-level to bi-level raster shape converter," Valdez and Martinez demonstrate a vector to monochrome raster conversion that uses a multi-bit pixel-depth raster image between the input and output stages. They recognize the problem of output pixels touching at the sides and recommend an output checkerboard pattern, but do not teach how to ensure that desired output is always achieved. In their FIG. 13C and FIG. 13D, Valdez and Martinez show an optimum output vertical line raster that still allows designated pixels to touch at the sides.

SUMMARY OF THE CLAIMED SUBJECT MATTER

Provided is a method for converting vector lines into a raster image, by first assigning each pixel of a plurality of pixels corresponding to a first raster image to either a first set of pixels or a second set of pixels to produce a checkerboard pattern of first and second set pixels; then overlaying a grid of angled lines over the checkerboard such that each of the first set of pixels are enclosed within diamond-shaped blocks created by the angled lines and each of the second set of pixels are traversed by the angled lines; then projecting a vector line corresponding to a vector-based image onto the checkerboard and the grid; and, finally, producing an output raster image by activating each pixel from the first set of pixels that is enclosed by a diamond-shaped block traversed by the projected vector line.

The method converts a vector image to a monochrome raster image using a monochrome raster image in a checkerboard pattern. A vector-based grid is superimposed over the checkerboard pattern in which parallel and perpendicular 45-degree angle vector lines touch the black checkerboard pixels only at their corners. The grid exhibits a plurality of diamond-shaped patterns each covering an area of two pixels. Each of the diamond patterns contains one black checkerboard pixel at its center and four quarter-sized adjacent triangular white regions. Input vectors are superimposed over the diamond grid and, if they traverse the diamond-shaped area, the black pixel at the center of the area is activated. The resulting output raster representation of the input vectors contains only pixels that touch at their corners and not at their sides.

The disclosed technology produces an output image that includes the following features:

a.) represents input vector elements by output raster pixels that touch only at their corners;

b.) eliminates the juxtaposition of side and corner contiguous pixels exhibited by competing methods, reducing the need for hinting and anti aliasing;

c.) enables the raster display of vector edge detail as a smooth gray when viewed at a suitable distance;

d.) utilizes only half of the available output raster pixels, those contained in the checkerboard, to depict input raster elements, reducing file size and computational complexity;

e.) improves digital monitor and printer raster displays for any personal computing or related device; and f.) accomplishes the above by means of a digital computing device.

This summary is not intended as a comprehensive description of the claimed subject matter but, rather, is intended to provide an overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE FIGURES

A better understanding of the claimed subject matter can be obtained when the following brief description of the disclosed embodiments is considered in conjunction with the following figures, in which:

DETAILED DESCRIPTION OF THE FIGURES

Although described with particular reference to a method for converting vector-based graphical images to raster-based images in conjunction with a personal computer, a monitor, or a printer, the claimed subject matter can be implemented in any information technology (IT) system in which accurate display of raster images is desirable. Those with skill in the computing and graphic arts will recognize that the disclosed embodiments have relevance to a wide variety of computing and graphical environments in addition to those described below. In addition, the methods of the disclosed technology can be implemented in software, hardware, or a combination of software and hardware. The hardware portion can be implemented using specialized logic; the software portion can be stored in a memory and executed by a suitable instruction execution system such as a microprocessor, personal computer (PC) or mainframe.

In the context of this document, a "memory" or "recording medium" can be, but is not limited to, any means that contains or stores the program and/or data for use by, or in conjunction with, an instruction execution system, apparatus or device. Memory and recording medium can be; but are not limited to, an electronic, magnetic, optical, electromagnetic or semiconductor system, apparatus or device. Memory and recording medium also includes, but is not limited to, for example the following: a portable computer diskette, a random access memory (RAM), a read-only memory (ROM), an erasable programmable read-only memory (EPROM or flash memory), and a portable compact disk read-only memory or another suitable medium upon which a program and/or data may be stored.

One embodiment, in accordance with the claimed subject, is directed to a programmed method for converting a vector-based image to a raster-based image. The term "programmed method", as used herein, is defined to mean one or more process steps that are presently performed; or, alternatively, one or more process steps that are enabled to be performed at a future point in time. The term "programmed method" anticipates three alternative forms. First, a programmed method comprises presently performed process steps. Second, a programmed method comprises a computer-readable medium embodying computer instructions, which when executed by a computer performs one or more process steps. Finally, a programmed method comprises a computer system that has been programmed by software, hardware, firmware, or any combination thereof, to perform one or more process steps. It is to be understood that the term, "programmed method" is not to be construed as simultaneously having more than one alternative form, but rather is to be construed in the truest sense of an alternative form wherein, at any given point in time, only one of the plurality of alternative forms is present.

Figure 1:
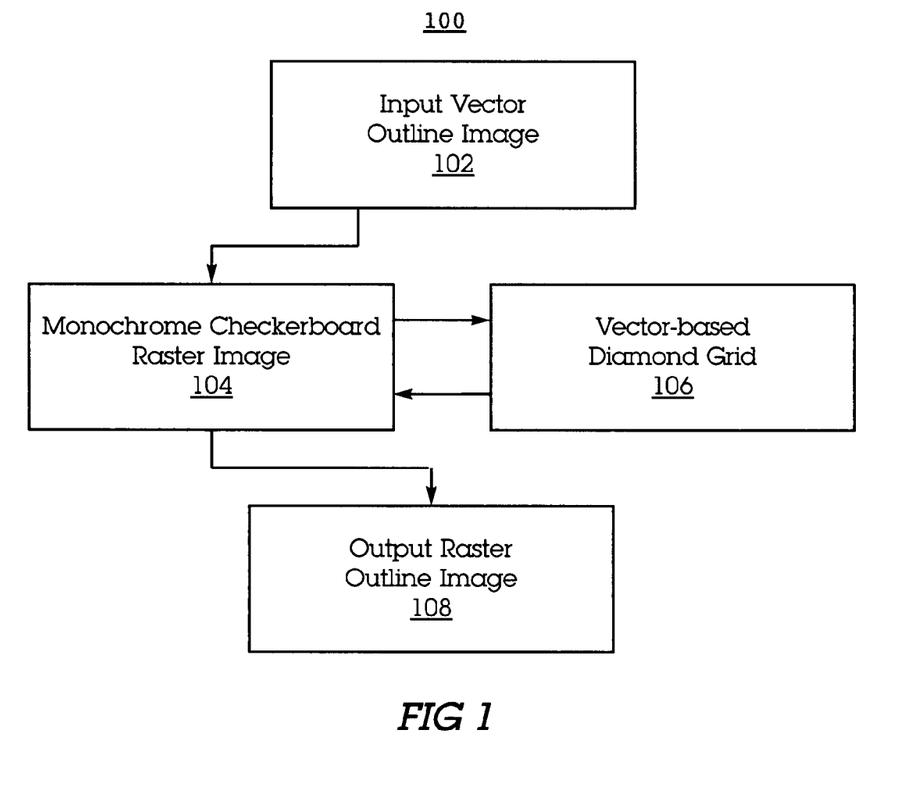
FIG. 1 illustrates an overview of one embodiment of the claimed subject matter, showing the relationships among various input, intermediate and output images of the claimed subject matter.

Turning now to the figures, FIG. 1 is a block diagram 100 illustrating a summary of possible stages in an image produced in accordance with the claimed subject matter, including possible relationships among input, intermediate and output images. An Input Vector Image 102 is projected on to a Monochrome Checkerboard Raster Image 104 that has been modified by a Vector-based Diamond Grid 106. Vector-based Diamond Grid 106 contains 45-degree lines that completely enclose each black checkerboard pixel within a diamond shape covering a two-pixel area (see FIG. 8). Input Vector Outlines falling within the diamond will activate the black checkerboard pixel within, producing an Output Raster Image 108.

Figure 2:
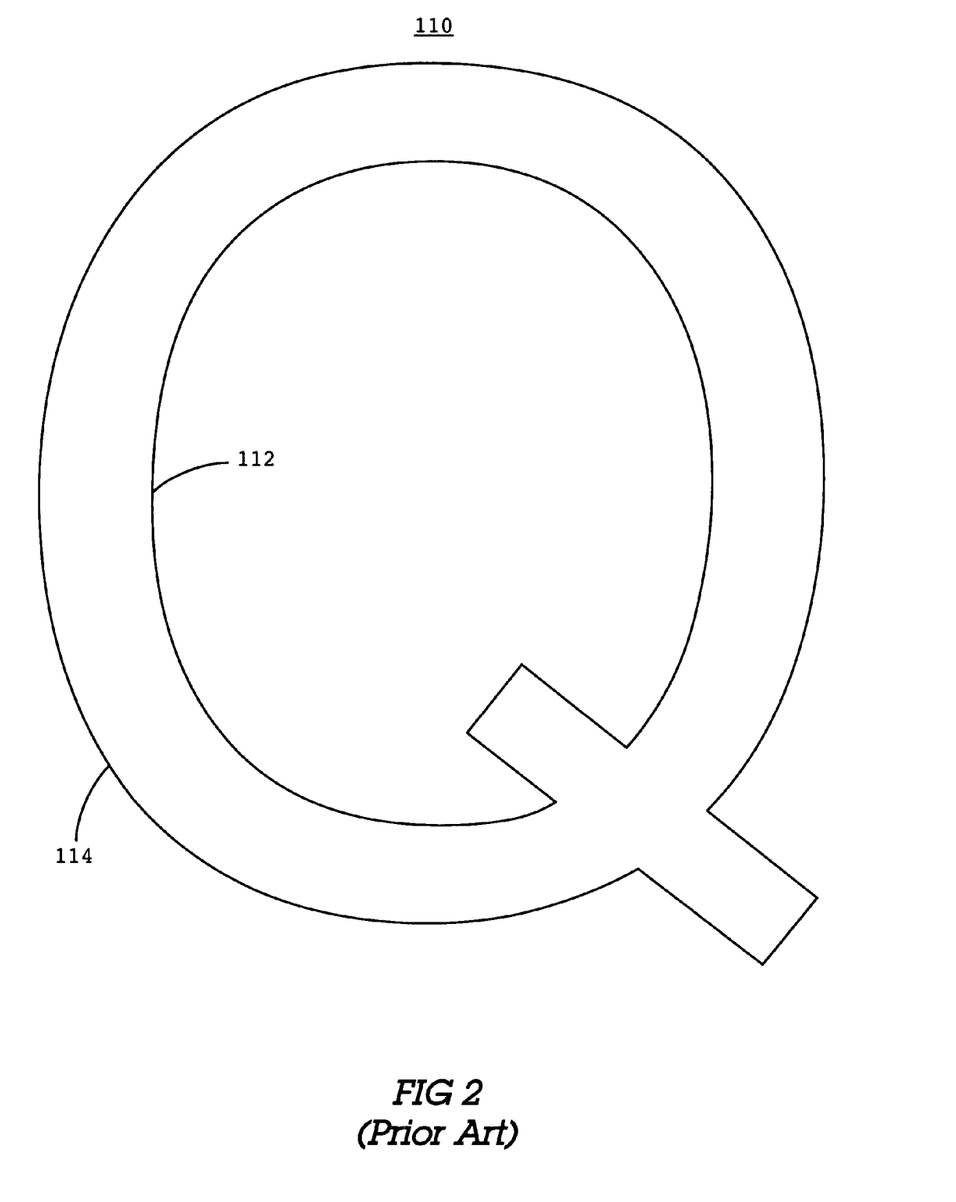
FIG. 2 shows a typical vector input, the letter "Q" in the Helvetica font, consisting of inside and outside outline vector shapes.

FIG. 2 illustrates a typical input vector image 110, the letter "Q" in the Helvetica font, consisting of an inside outline vector shape 112 and an outside outline vector shape 114. Image 110 is employed throughout the remainder of this Description as an example of a vector image to be reproduced in raster image format in accordance with the claimed subject matter.

Figure 3:
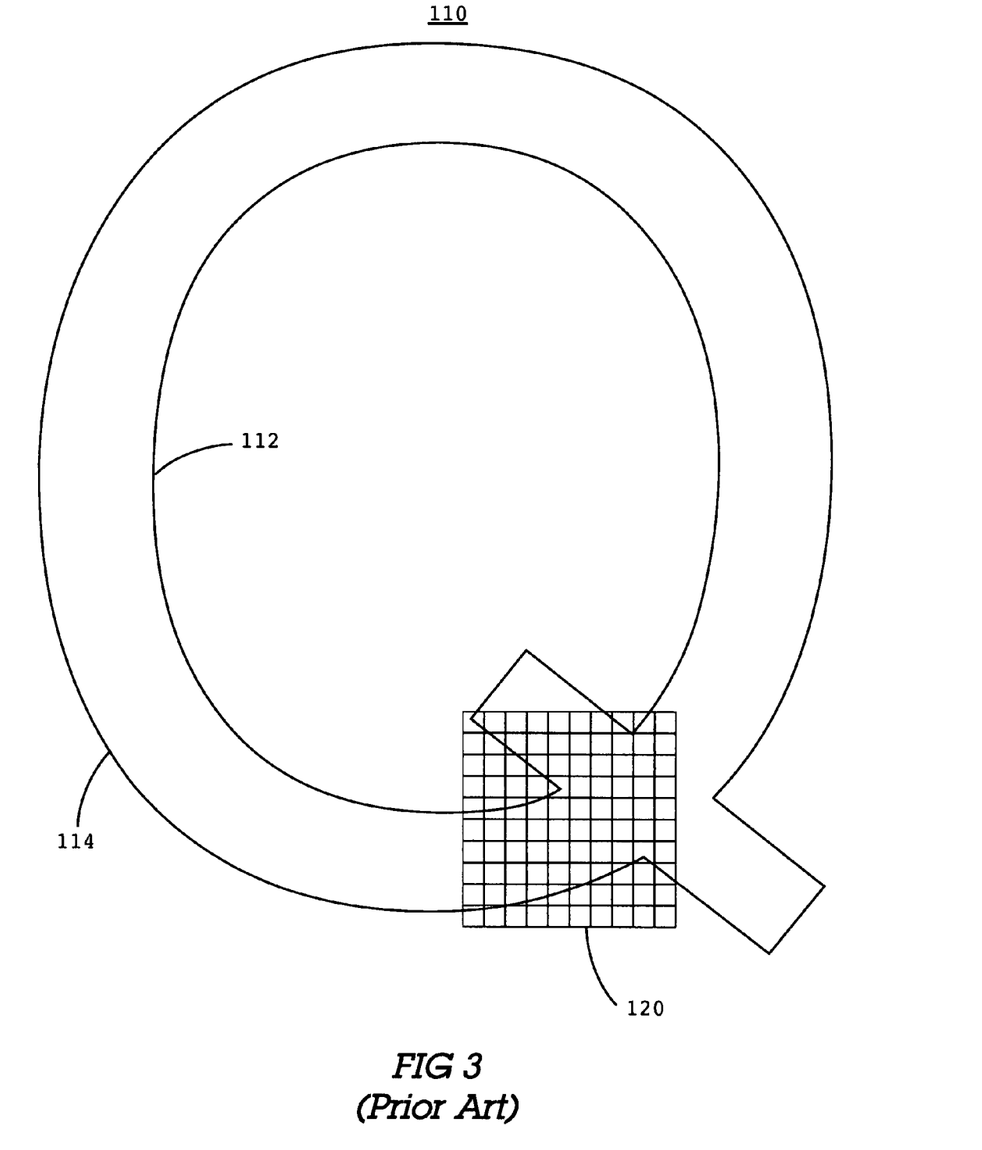
FIG. 3 shows the inside and outside outline vector shapes of FIG. 2 superimposed over an output raster bitmap.

FIG. 3 illustrates portions of inside vector shapes 112 and 114 (FIG. 2) superimposed over an output raster bitmap 120 with dimensions ten (10) pixels wide by ten (10) pixels high.

Figure 4:
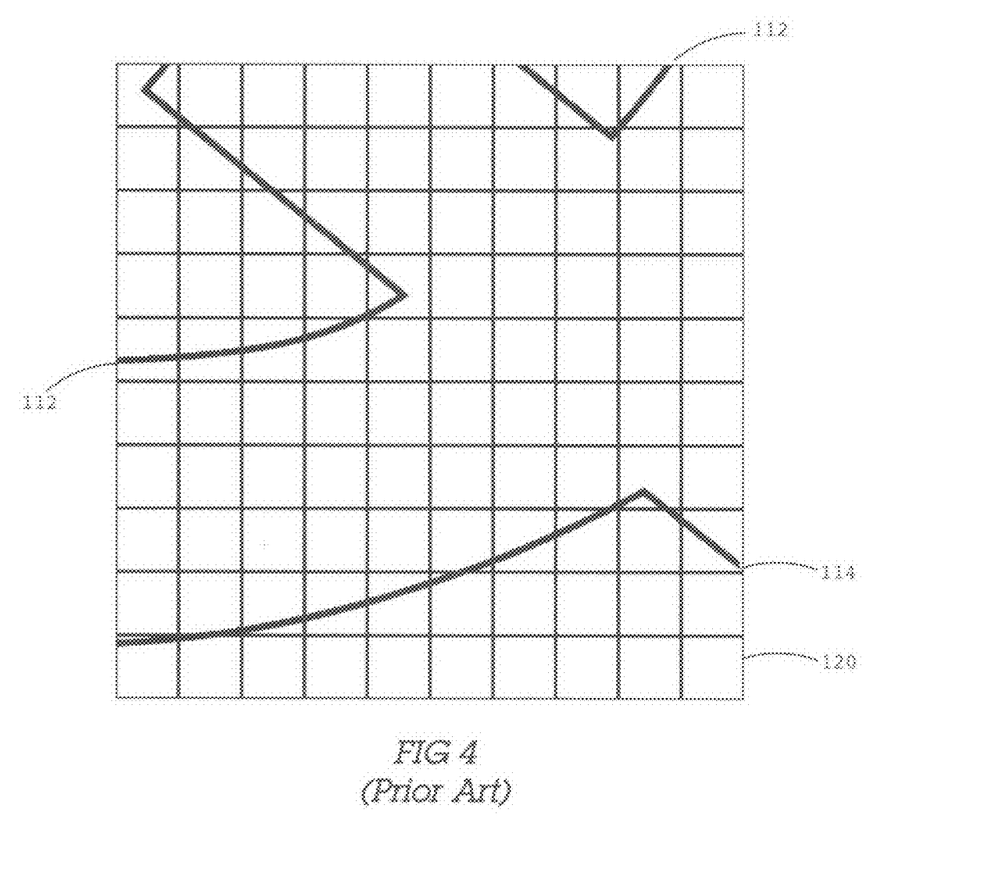
FIG. 4 shows just the portions of the outline vectors of FIG. 2 contained within the output raster bitmap of FIG. 3.

FIG. 4 is an expanded view of FIG. 3, showing the portions of outline vectors 112 and 114 of FIG. 3 contained within output raster 10-pixel-by-10-pixel bitmap 120 of FIG. 3.

Figure 5:
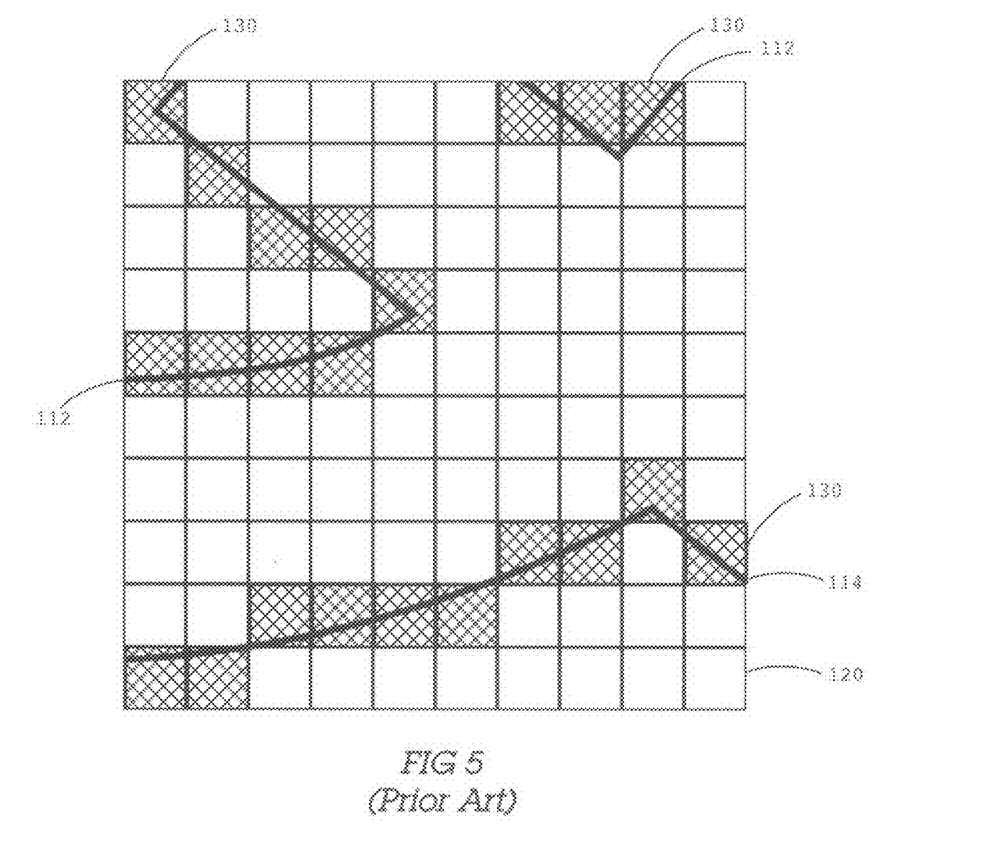
FIG. 5 shows the output raster pixels activated by a typical input vector projection using all available pixels.

FIG. 5 illustrates output raster pixels 130 activated by a typical input vector projection of outline vectors 112 and 114 (FIGS. 2, 4 and 5) using all available pixels of pixel bitmap 120 (FIGS. 3 and 4). For the sake of simplicity, only a few of activated pixels 130 are labeled.

Figure 6:
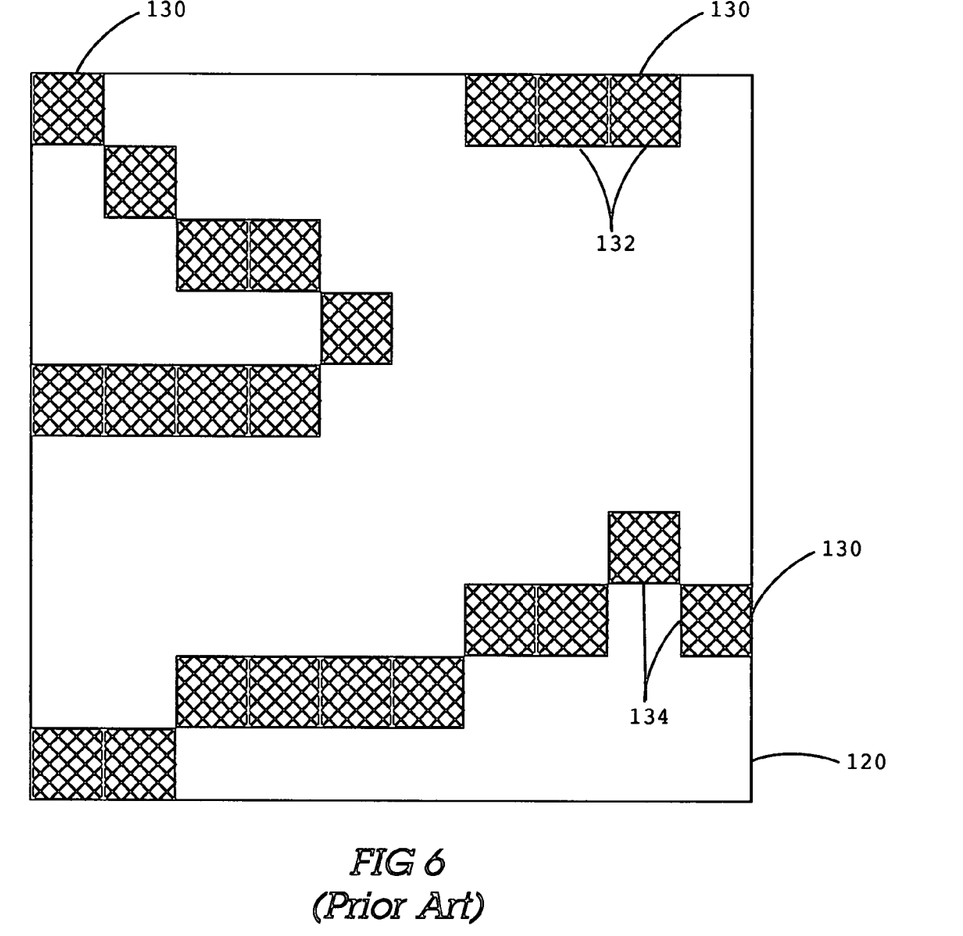
FIG. 6 shows a typical final output raster image representation of the input outline vectors with both side-contiguous and corner-contiguous pixels.

FIG. 6 illustrates a representation of a typical final output raster image of input outline vectors 112 and 114 (FIGS. 2-5) on grid 120 (FIGS. 3-5). It should be noted that individual pixels are activated regardless of whether they are side-contiguous pixels such as, for example, a pair of pixels 132, or corner-contiguous pixels such as, for example, a pair of pixels 134.

Figure 7:
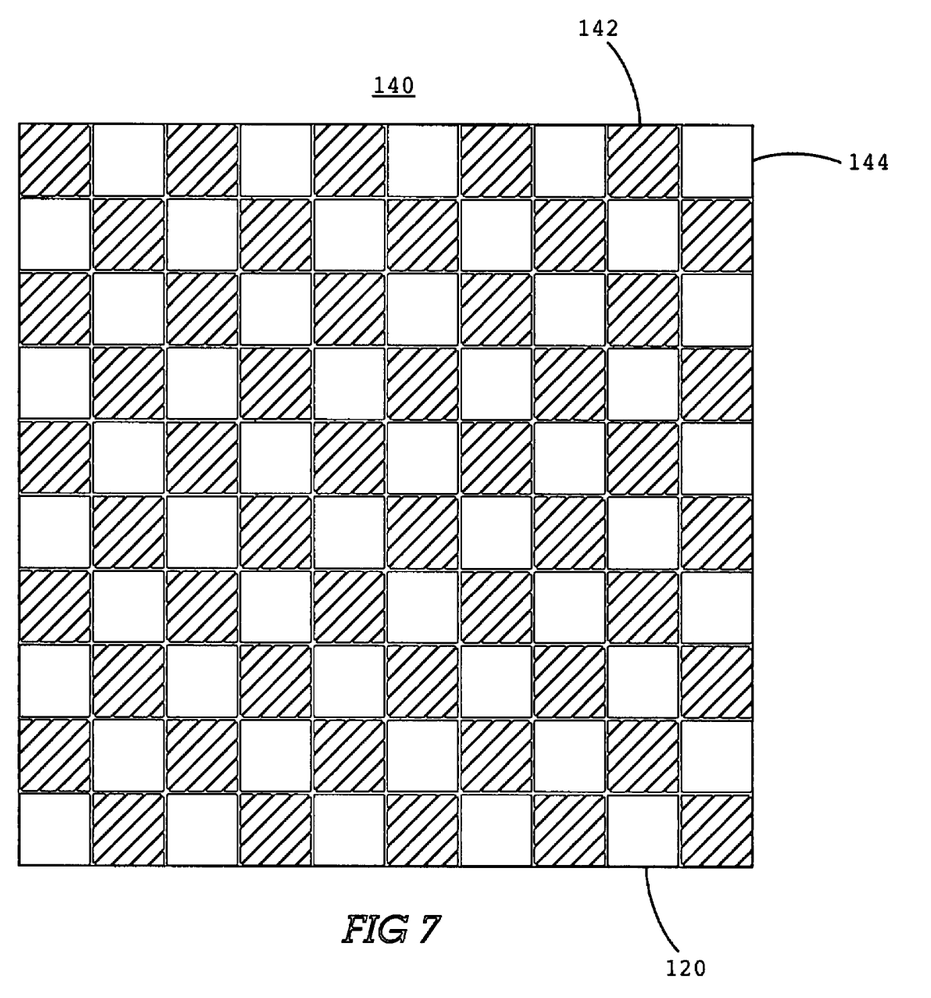
FIG. 7 shows the output raster bitmap of FIG. 3 according to the claimed subject matter as a monochrome raster image in a checkerboard pattern utilized in one embodiment of the present invention.

FIG. 7 illustrates 10-pixel-by-10-pixel area 120 (FIGS. 3-7) recast as a monochrome raster image 140 in a checkerboard pattern in one embodiment of the disclosed technology. In other words, activated pixels, such as pixel 142, are corner contiguous with each other and pixels that are not activated, such as pixel 144, are also corner-contiguous with each other. With regard to any two side-contiguous pixels, such as pixels 142 and 144, only one is activated.

Figure 8:
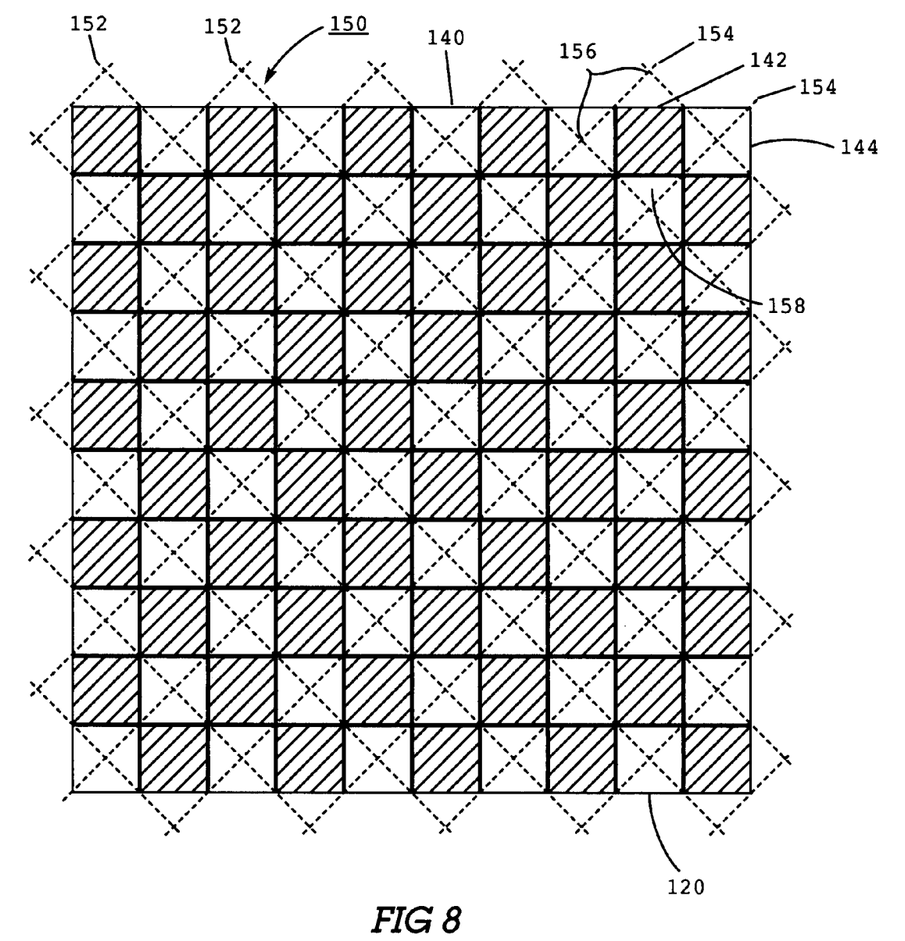
FIG. 8 shows a vector-based diamond grid superimposed over the monochrome checkerboard raster image.

FIG. 8 illustrates a vector-based diamond grid 150 that is superimposed over the monochrome checkerboard raster image 140 (FIG. 7). Note that parallel and perpendicular 45-degree angled lines, such as lines 152 and 154, form diamond shapes, such as a diamond 156, that enclose each black checkerboard pixel, such as activated pixel 142 (FIG. 7), touching them only at their corners. For the sake of simplicity, only one diamond 156 and a few 45-degree angled lines 152 and 154 are labeled. Also note that each diamond-shaped area 156 covers an area of two pixels, including one black checkerboard pixel 142 and four quarter-pixel triangular areas, such as pixel area 158, adjacent to the sides of activated pixels 142.

Figure 9:
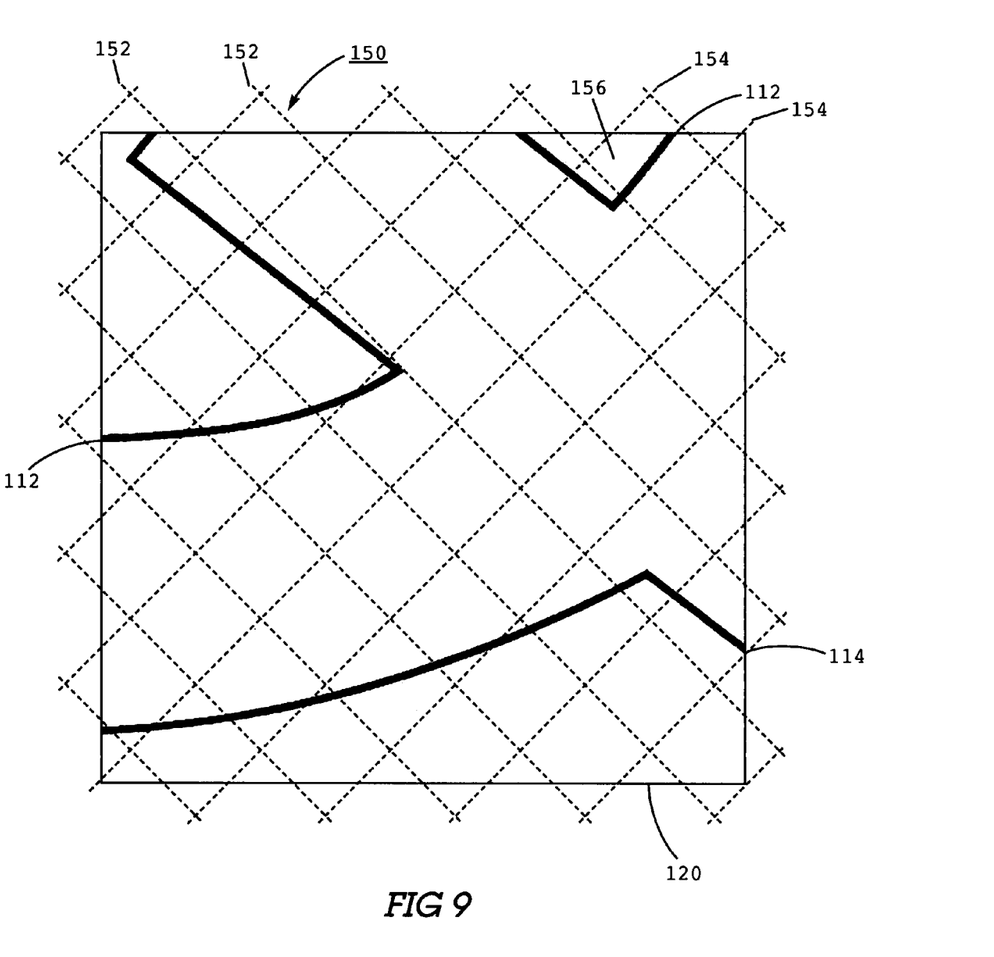
FIG. 9 shows the input vector shapes of FIG. 2 superimposed over the vector-based diamond grid of FIG. 8.

FIG. 9 illustrates the portions of input vector shapes 112 and 114 (FIGS. 2-5) superimposed over vector-based diamond grid 150 (FIG. 8). FIG. 9 should be compared to FIG. 4 in which vector shapes 112 and 114 are superimposed over grid 120 (FIGS. 3-5).

Figure 10:
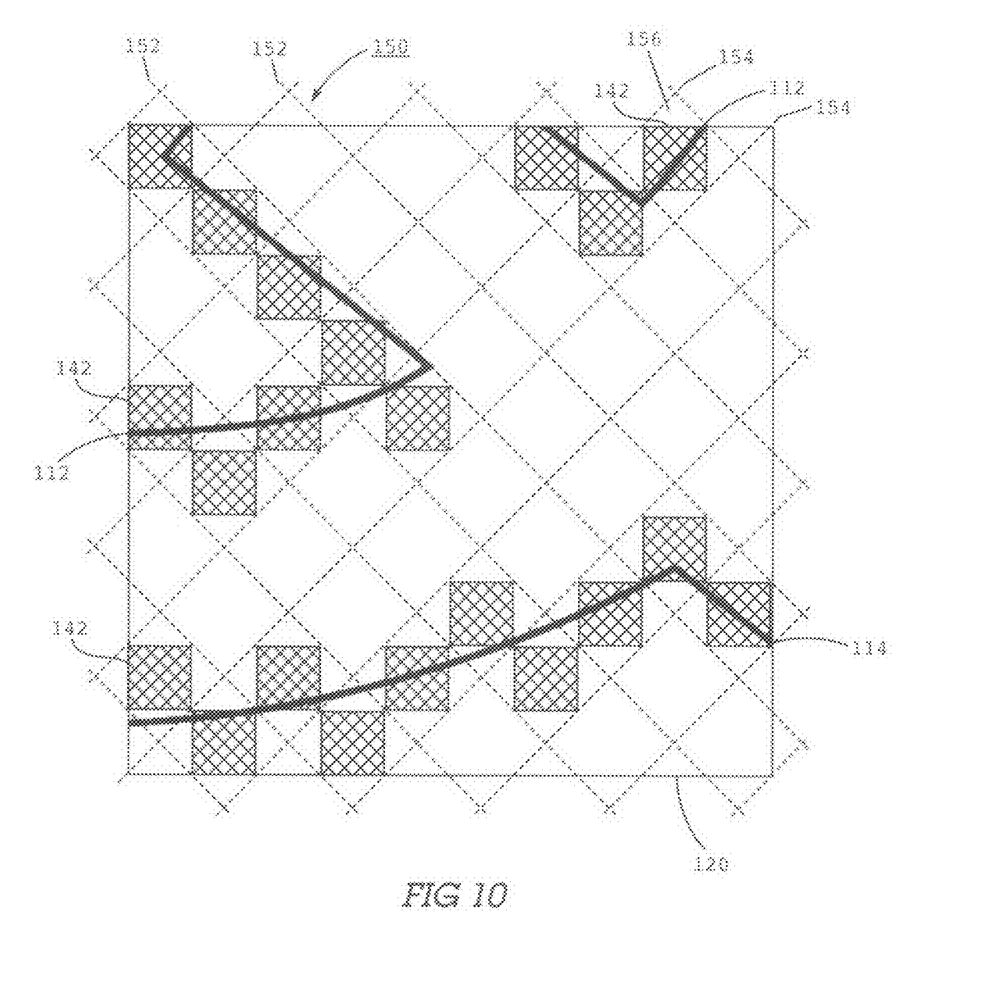
FIG. 10 shows one embodiment of the present invention designating the output raster pixels activated by the input vector projection using only the monochrome checkerboard pixels.

FIG. 10 illustrates output raster pixels, such as pixel 142 (FIG. 10), activated by an input vector projection based upon input vector shapes 112 and 114 (FIGS. 2-5 and 9). Note that only activated pixels from monochrome checkerboard 140 (FIGS. 7 and 8) pixels are used. The projection of FIG. 10 should be compared to the projection illustrated above in FIG. 5.

Figure 11:
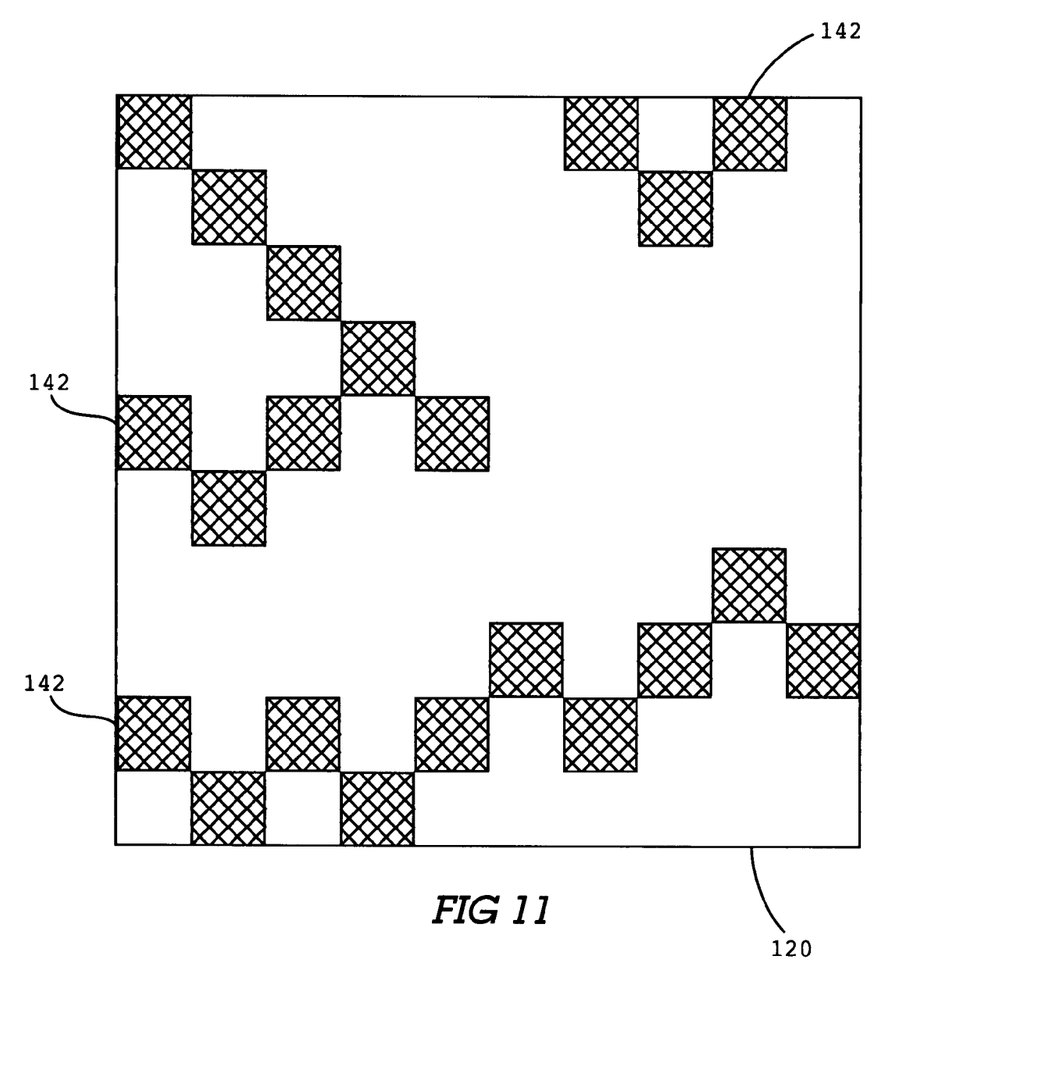
FIG. 11 shows one embodiment of the claimed subject matter in which the final output raster image representation of the input outline vectors contains only corner-contiguous pixels.

FIG. 11 shows a final output raster image representation 110 (FIG. 2) of the portions of input outline vectors 112 and 114 (FIGS. 2-5, 9 and 10) containing only corner-contiguous pixels such as pixel 142 (FIGS. 7, 8 and 10). The representation of FIG. 11 should be compared to the representation illustrated in FIG. 6.

Figure 12:
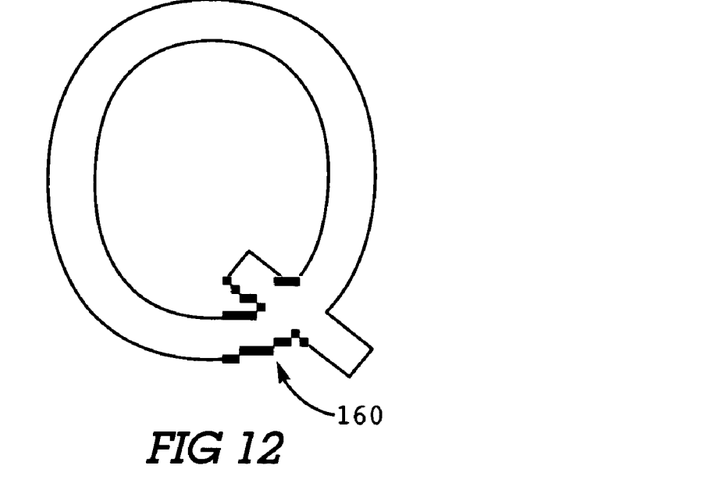
FIG. 12 shows the output raster image representation of FIG. 6 superimposed over the input vector image of FIG. 3.

FIG. 12 illustrates the typical output raster image representation of FIG. 6 superimposed over the input vector image of FIG. 3. Note that the mixing of both side and corner contiguous black pixels creates a blocky look at the affected area 160.

Figure 13:
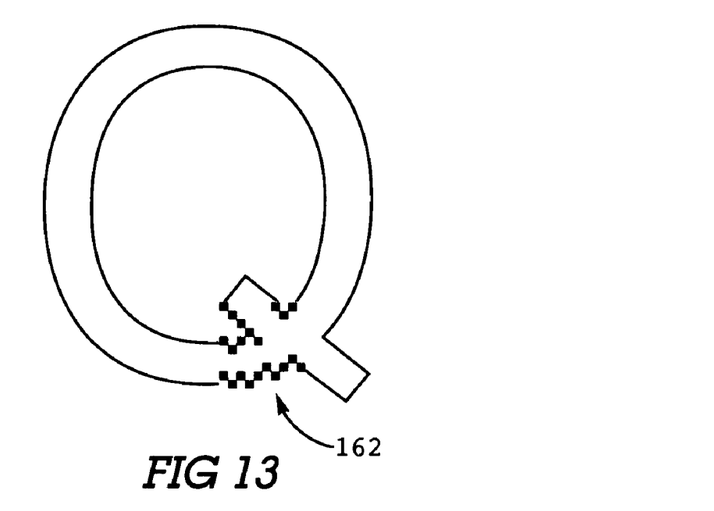
FIG. 13 shows the output raster image representation of FIG. 11 superimposed over the input vector image of FIG. 3.

FIG. 13 illustrates the output raster image representation of FIG. 11 utilizing the method of claimed subject matter superimposed over the input vector image of FIG. 3. Note that only corner-contiguous black pixels are used, creating an airy look at the affected area 162.

Figure 14:
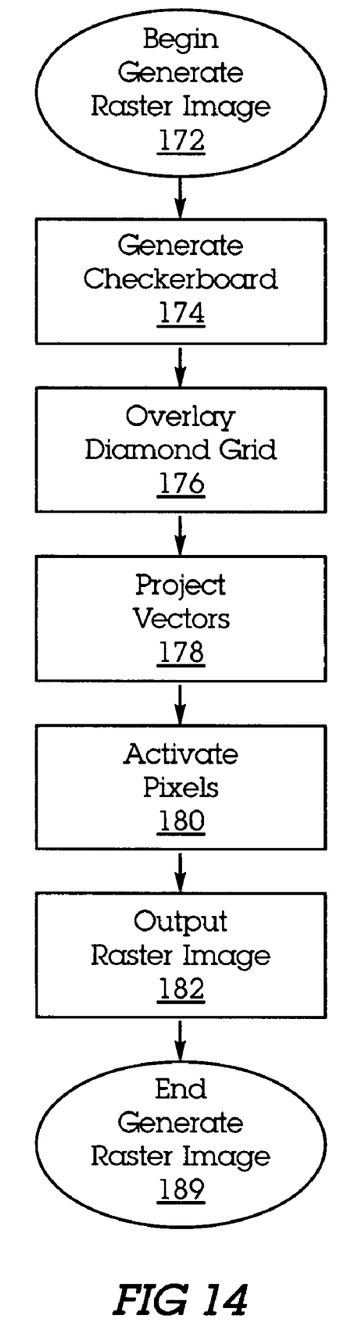
FIG. 14 is a flowchart of one embodiment of the processes employed to produce an image according to the claimed subject matter.

FIG. 14 is a flowchart of Generate Raster Image process 170 employed to produce an image according to the claimed subject matter. Process 170 starts in a "Begin Generate Raster Image" block 172 and proceeds immediately to a "Generate Checkerboard" block 174. During block 174, process 170 generates a monochrome checkerboard bitmap image, which in this example is checkerboard 140 introduced above in conjunction with FIG. 7. As explained above in conjunction with FIG. 7, pixels of checkerboard 140 are grouped into potentially active pixels 142 and inactive pixels 144.

During an "Overlay Diamond Grid" block 176, process 170 generates a diamond-shaped grid, such as diamond grid 150 introduced above in conjunction with FIG. 8, and overlays grid 150 on top of checkerboard 140. During a "Project Vectors" block 178, process 170 projects vector shapes 112 and 114 (FIG. 8-10) on to the checkerboard/diamond-shaped grid generated during blocks 174 and 176. During an "Activate Pixels" block 180, process 170 activates any pixel 142 that falls within a diamond-shape box 156 through which either vector 112 or 114 pass. During an "Output Raster Image" block 182, process 170 transmits the image generated during block 180. The image may be transmitted to a printer or video monitor for printing or display, respectively; transmitted over a communication medium; or employed in any situation that makes use of a raster image. Finally, during an "End Generate Raster Image" block 189, process 170 is complete.

Figure 15:
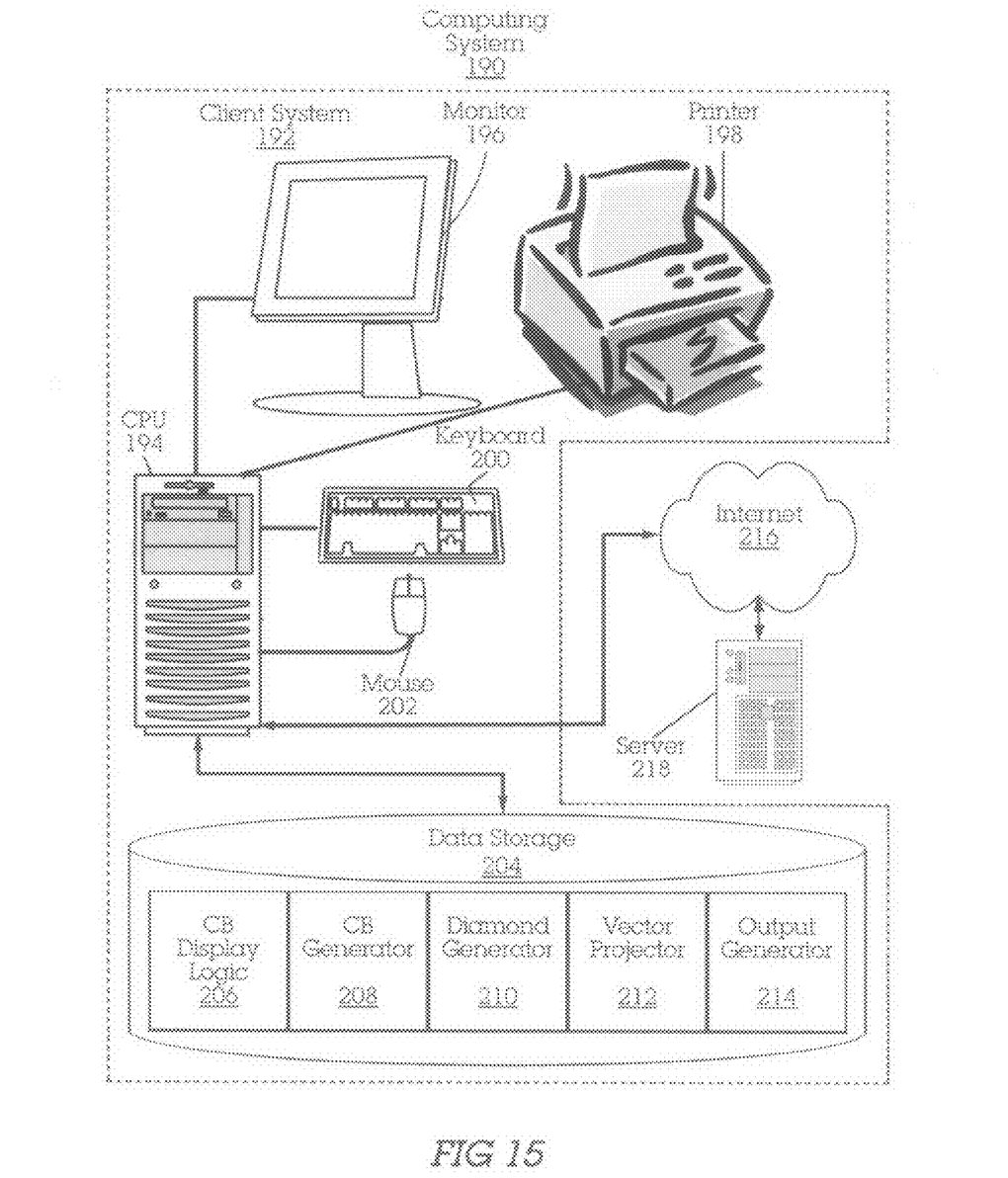
FIG. 15 is a block diagram of an exemplary computing system that incorporates the claimed subject matter.

FIG. 15 is a block diagram of one example of a computing system architecture 190 that incorporates the claimed subject matter. A client system 192 includes a central processing unit (CPU) 194, coupled to a monitor 196, a printer 198, a keyboard 200 and a mouse 202, which together facilitate human interaction with computing system 190 and client system 192.

Also included in client system 192 and attached to CPU 194 is a data storage component 204, which may either be incorporated into CPU 194, i.e. an internal device, or attached externally to CPU 194 by means of various, commonly available connection devices such as but not limited to, a universal serial bus (USB) port (not shown). Data storage 204 is illustrated storing an example of checkerboard display logic 206 that incorporates the claimed subject matter. Logic 206 includes a generate checkerboard module 208, a generate diamond module 210, a project vector module 212 and a generate output module 214. It should be noted that a typical computing system would include more than logic 206, 208, 210, 212 and 214, such as an operating system and applications, but for the sake of simplicity only modules 206, 208, 210, 212 and 214 are shown.

Client system 192 and CPU 194 are connected to the Internet 216, which is also connected to a server computer 218. Although in this example, client system 192 and server 218 are communicatively coupled via the Internet 216, they could also be coupled through any number of communication mediums such as, but not limited to, a local area network (LAN) (not shown). Further, it should be noted there are many possible computing system configurations, of which computing system 190 is only one simple example.

Operation

The disclosed technology acts upon an input vector element (line or point), such as vector line elements 112 and 114 (FIGS. 2-5, 9 and 10), to reproduce the element in an output monochrome raster grid, such as grid 120 (FIGS. 3-11). In FIG. 7, a portion of the output raster grid 120 of dimensions 10-pixels-by-10-pixels is represented by a checkerboard pattern 140 (FIGS. 7 and 8). Note that only certain of the black checkerboard pixels are used to depict the input raster outlines.

To enable the depiction, a second image 150 (FIGS. 8-10) is constructed consisting of 45-degree angled vector lines parallel and perpendicular to each other, such as lines 152 and 154 (FIGS. 8-10). The positioning of vector grid 150 is such that lines 152 and 154 touch the black checkerboard pixels 142 (FIGS. 7 and 8) only at their corners.

For example, if the output raster image is to be 300 pixels per inch and each checkerboard pixel is 0.0033+ inches per side, the distance between the angled vector lines will be the hypotenuse of the right triangle that halves the checkerboard pixel. Using the Pythagorean Theorem, i.e. the square of the hypotenuse is equal to the sum of the squares of the two right triangle sides, the hypotenuse is determined to be 0.0023+ inches. This distance is the side of the diamond shaped square that wholly contains one black checkerboard pixel.

The center of the first +45-degree (right sloping) line will be at +0.0000, +0.0000 (the upper left corner of the first black checkerboard pixel.) The successive parallel +45-degree lines will be spaced 0.0023+ inches apart. The middle two −45-degree (left sloping) lines will pass through +0.0033, +0.0000 and +0.0000, +0.0033, respectively (the upper right corner and the lower left corner of the first black checkerboard pixel.) Again successive parallel −45-degree lines in both directions will be spaced 0.0023+ inches apart.

The 45-degree parallel and perpendicular vector lines will continue to be placed over the checkerboard pattern until all of the black checkerboard pixels are completely enclosed. Then the checkerboard pattern is temporarily set aside, leaving only 45-degree angled vector diamond grid 150. As shown, the input vector outline to be reproduced is projected on to 45-degree angled vector diamond grid 150. If an input vector element traverses one of the diamond-shaped areas, the black checkerboard pixel from the checkerboard pattern (now brought back) that is enclosed by that diamond-shaped area is activated in the output raster, FIG. 9. Now discarding both the checkerboard pattern raster image and the vector-based diamond grid, the activated corner contiguous black pixels are used to reproduce the outline vectors, FIG. 11. Following the reproduction of the outline vectors, any method to rasterize a fill within the outline vector representation may be used.

Projecting the outline representations onto the corresponding input image, FIG. 13, a smooth gray edge will be apparent when viewed at a suitable distance, eliminating the need for hinting and anti-aliasing software.

CONCLUSION, RAMIFICATIONS, AND SCOPE

Accordingly, one with skill in the art should see that the disclosed technology can be used to depict any input vector image in output raster image form. By utilizing a monochrome raster image in a checkerboard pattern and an input vector-based diamond pattern overlay, only corner-contiguous pixels are used to depict edge detail. The resulting raster image will portray the edge detail as a smooth gray from a suitable distance, whether the input vector to be reproduced is curved, angled, vertical or horizontal.

In addition, since the method reduces the total possible number of output raster pixels by half (only the black checkerboard pixels), efficiencies in file size and computational complexity may be realized. The method of this invention can be included in digital monitor and printer raster displays for all personal computing devices including, but not limited to, cell phones, pen-based computers, ebooks, etc.

While the claimed subject matter has been shown and described with reference to particular embodiments thereof, it will be understood by those skilled in the art that the foregoing and other changes in form and detail may be made therein without departing from the spirit and scope of the claimed subject matter, including but not limited to additional, less or modified elements and/or additional, less or modified blocks performed in the same or a different order.

I claim:

1. A method for converting a vector-based image into an output raster image, comprising:
    generating, by a computing device, a first raster image in a checkerboard pattern by assigning each pixel of a plurality of pixels to either a first set of pixels or a second set of pixels;
    superimposing, by the computing device, a grid of angled lines over the checkerboard pattern of the first raster image such that each of the first set of pixels are enclosed within diamond-shaped blocks created by the angled lines and each of the second set of pixels are traversed by the angled lines;
    superimposing, by the computing device, a vector line corresponding to the vector-based image onto the checkerboard pattern and the grid of the angled lines; and
    generating, by the computing device, the output raster image by activating each pixel from the first set of pixels that is enclosed by a diamond-shaped block traversed by the projected vector line.

2. The method of claim 1, further comprising displaying the output raster image on a monitor display.

3. The method of claim 1, further comprising printing the output raster image on a digital printer.

4. The method of claim 1, wherein the activated pixels are corner contiguous.

5. A processor-based apparatus for converting a vector-based image into an output raster image, comprising:
    a first generator module configured to generate a first raster image in a checkerboard pattern by assigning each pixel of a plurality of pixels to either a first set of pixels or a second set of pixels;
    a second generator module configured to superimpose a grid of angled lines over the checkerboard pattern of the first raster image such that each of the first set of pixels are enclosed within diamond-shaped blocks created by the angled lines and each of the second set of pixels are traversed by the angled lines;
    a projection module configured to superimpose a vector line corresponding to the vector-based image onto the checkerboard pattern and the grid of the angled lines; and
    a third generator module configured to generate the output raster image by activating each pixel from the first set of pixels that is enclosed by a diamond-shaped block traversed by the projected vector line.

6. The apparatus of claim 5, further comprising a monitor display configured to display the output raster image.

7. The apparatus of claim 5, further comprising a digital printer configured to print the output raster image.

8. The apparatus of claim 5, wherein the activated pixels are corner contiguous.

9. An article of manufacture including a non-transitory computer readable medium having instructions stored thereon that, if executed by a computing device, cause the computing device to perform operations, comprising:
    generating a first raster image in a checkerboard pattern by assigning each pixel of a plurality of pixels corresponding to a first raster image to either a first set of pixels or a second set of pixels;
    superimposing a grid of angled lines over the checkerboard pattern of the first raster image such that each of the first set of pixels are enclosed within diamond-shaped blocks created by the angled lines and each of the second set of pixels are traversed by the angled lines;
    superimposing a vector line corresponding to a vector-based image onto the checkerboard pattern and the grid; and
    generating an output raster image by activating each pixel from the first set of pixels that is enclosed by a diamond-shaped block traversed by the projected vector line.

10. The article of manufacture of claim 9, wherein the operations further comprise displaying the output raster image on a monitor display.

11. The article of manufacture of claim 9, wherein the operations further comprise printing the output raster image on a digital printer.

12. The article of manufacture of claim 9, wherein the activated pixels are corner contiguous.

\* \* \* \* \*

UNITED STATES PATENT AND TRADEMARK OFFICE
CERTIFICATE OF CORRECTION

| | | |
|---|---|---|
| PATENT NO. | : 7,956,861 B2 | Page 1 of 1 |
| APPLICATION NO. | : 11/890003 | |
| DATED | : June 7, 2011 | |
| INVENTOR(S) | : Case | |

It is certified that error appears in the above-identified patent and that said Letters Patent is hereby corrected as shown below:

Column 8, line 36, in Claim 9, delete "operations," and insert -- operations --.

Signed and Sealed this
Fourth Day of October, 2011

David J. Kappos
*Director of the United States Patent and Trademark Office*